United States Patent Office 3,219,647
Patented Nov. 23, 1965

3,219,647
REMOVAL OF CATALYST RESIDUES
FROM POLYMERS
Richard E. Dietz, Bartlesville, Okla., assignor to Phillips
Petroleum Company, a corporation of Delaware
No Drawing. Filed Apr. 26, 1962, Ser. No. 190,263
5 Claims. (Cl. 260—93.7)

This invention relates to the removal of the catalyst residues from polymers.

Various reactions for polymerizing olefins are described in the literature, and the polymerizations are usually carried out in the presence of catalysts. One of the problems encountered with polymers prepared by such processes concerns the presence in the polymer of catalyst residues, or ash-forming ingredients. The "ash content" of a product refers to the inorganic constituents which are present in the polymer in unidentified form and which produce ash when the polymer is burned. The presence of these catalyst residues in the polymer adversely affects the color and heat stability of the polymer, as well as its electrical properties.

Various treating methods have been proposed and tried by the prior art for the removal of such catalyst residues. It has been suggested that dicarbonyl compounds containing the group

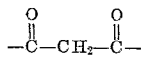

such as acetylacetone and the like, can be employed as treating agents for removal of catalyst contaminants.

However, the reaction of the treating agent with metal halides, when such are present in the catalyst, is accompanied by the evolution of a hydrogen halide. This is most usually hydrogen chloride since the metal chlorides are usually employed as catalysts. HCl generation can lead to significant operating problems, especially in commercial equipment, in the nature of potential corrosion of conduits and vessels. Moreover, with certain of the dicarbonyl compound type of chelating agents, only moderate rates of extraction are obtained when they are used alone to sequester the catalyst residues. Also, it is believed that, at least in some instances, the presence of hydrogen chloride may tend to inhibit the chelating reaction. The present invention is concerned with a method for employing chelating agents in which these difficulties are overcome by the presence of certain adjuvant materials used therewith. I have found that the use of my adjuvant substantially improves the residue extraction rates.

It has further been observed in a continuous operation for treatment of the reactor effluent with certain of the dicarbonyl compound type of chelating agents alone, that the solid polymer particles have a distinct tendency to agglomerate and plug up the treating vessel.

It is an object of the present invention to provide an improved process for producing polymers of mono-1-olefins containing a low catalyst residue.

Another object of the invention is to provide a process for treating polymers in order to remove catalyst residues associated therewith.

A still further object of the invention is to provide a process for polymerizing mono-1-olefins wherein the polymerization effluent containing liquid monomer and solid polymer is treated so as to remove catalyst residues.

A still further object of the invention is to provide a process for treating a stream containing polymer suspended in a hydrocarbon diluent so as to remove catalyst residues without said removal being inhibited by undesirable hydrogen halides.

Yet another object of the invention is to prevent the agglomeration of solid polymer particles on the surfaces of the vessel in which the reactor effluent is treated to remove catalyst residues.

Accordingly, it is an object of this invention to provide a method of removing catalyst residues from a polymer wherein a halogen is a part of the catalyst complex.

Various other objects and advantages of this invention will become apparent to those skilled in the art from the following discussion and appended claims.

Broadly speaking, our invention is applicable to removal of catalyst residues from polymers prepared in the presence of a catalyst composition having at least one halogen atom attached to a metal atom.

In accordance with this invention, the foregoing objects are attained by the use of a combination of a treating agent comprising a dicarbonyl compound with an alkylene oxide having from 2 to 8 carbon atoms, the oxide acting as an adjuvant, or assistant, for the dicarbonyl chelator. In many instances, the amount of chelating agent necessary to reduce catalyst residues to acceptable levels can be reduced, thus the adjuvant operates to enhance the effectiveness of the chelating agent, in one aspect by acting as a scavenger for the hydrogen halides liberated from reaction of catalyst with the chelating agents.

As mentioned hereinbefore, the polymers which are treated in accordance with the present process are prepared from 1-olefins and/or conjugated diolefins. The present invention is particularly applicable to the treatment of polymers which are prepared by polymerizing 1-olefins containing from 2 to 20 carbon atoms. Examples of such monomers include ethylene, propylene, 1-butene, 1-pentene, 3-methyl-1-butene, 1-hexene, 1-heptene, 1-octene, 4-methyl-1-pentene, 3-methyl-1-hexene, 1,3-butadiene, isoprene, 2,3-dimethyl butadiene, 2-methoxybutadiene, 1-eicosene, 4-ethyl-1-octadecene, 6-methyl-1-dodecene, 1,3-eicosadiene, 4,6-diethyl-1,3-decadiene, 4,5-dimethyl-1-cotene, 1-hexadecene and the like. This invention is particularly applicable to the treatment of polypropylene to remove catalyst residues. It is to be understood that mixtures of two or more monomers can be employed in the polymerization to produce copolymers which are then treated by the present process. Examples of such copolymers include ethylene-propylene and ethylene-butene-1.

This invention is applicable to the treatment of polymers prepared by the use of catalyst compositions comprising at least one component having at least one halogen atom attached to a metal atom. Such catalyst compositions often include two or more components, one of which is a compound of a metal selected from Groups IV, V, VI and VIII of the Periodic Table according to Mendeleev, the second component being selected from organometal compounds, metal hydrides, and metals of Groups I, II and III of the Periodic Table. Numerous examples of these catalyst compositions are well known in the art.

Examples of the second-mentioned component which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, methylaluminum dichloride, dimethylaluminum chloride, ethylaluminum dichloride, diethylaluminum chloride, di-n-butylaluminum bromide, isooctylaluminum diiodide, di-n-propylgallium fluoride, eicosylgallium dibromide, ditetradecylgallium fluoride, dicyclohexylgallium chloride, diphenylgallium bromide, diphenylindium chloride, dioctylindium fluoride, cyclohexylindium dibromide, 3-methylcyclohexylaluminum dichloride, 2-cyclohexylethylgallium dichloride, p-tolylberyllium iodide, di(3-phenyl-1-methylpropyl)indium fluoride, 2-(3-isopropylcyclohexyl)ethylthallium dibromide, and the like.

The metal hydrides can include, as specific examples, aluminum hydride, lithium aluminum hydride, barium hydride, gallium hydride, indium hydride, sodium aluminum hydride, potassium beryllium hydride.

The metals of the first, second and third groups are applicable as a class, the most important members being sodium, magnesium and aluminum.

The compounds of a metal of Groups IV, V, VI and VIII of the Periodic System include the oxides, hydrides, halides, oxyhalides and salts of organic acids, usually having twenty or less carbon atoms, such as formic acid, of the said groups of metals, such as titanium, zirconium, chromium, thorium, molybdenum and vanadium.

The alcoholates of a metal of Group IV of the Periodic System which can be employed conform to the formula $X_nM(OR)_m$, where $m+n$ equals the valence of the metal M, X is a halogen, and R is an organic radical usually having twenty or less carbon atoms, and preferably being an alkyl, cycloalkyl or aryl group. Specific examples of such alcoholates are titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl)-titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichloro diethyl titanate $$(Cl_2Ti(OC_2H_5)_2)$$

monochloro-triethyl titanate $(ClTi(OC_2H_5)_3)$ and the dichloro-diethyl zirconate $(Cl_2Zr(OC_2H_5)_2)$. Also included are such compounds as $Hf(OCH_3)_4$, $Th(OC_3H_7)_4$,

$Cl_2Hf(OC_{10}H_{21})_2$, $Th(OC_6H_{13})_4$, and $Zr(OC_{12}H_{25})_4$

A third catalyst component which can be used advantageously is an organic halide or metal halide where the organic radical has thirty or less carbon atoms, and is advantageously an alkyl, cycloalkyl or aryl group. Specific examples are ethyl bromide, ethyl trichloro titanium, 1-bromobenzene, cyclohexyl chloride. Also applicable are an alkali metal or ammonium halide, an aluminum halide (where the catalyst also includes another metal compound such as a titanium compound), a halogen, a hydrogen halide, a complex hydride, a mixture of an organic halide and a metal, and Grignard reagent.

A still more specific subgroup of catalysts where excellent color and low ash content are obtained by the practice of the invention include catalysts where an organometal compound is used in combination with a metal salt. The ratios of the catalyst compounds can vary widely, depending upon the particular charge used and operating conditions, say from 0.02 to 50 mols of the first component per mol of the second catalyst component. If a third component is present, the amount can vary from 0.02 to 50 mols per mol of the second component.

Examples of suitable catalyst systems in accordance with the foregoing disclosure are as follows:

(a) Aluminum trialkyls, e.g., triethylaluminum or triisobutylaluminum and the tetravalent metal halides of the type represented by titanium tetrachloride;

(b) An organic halide (such as ethyl bromide), a Group IV inorganic halide (such as titanium tetrachloride), and a low valence metal selected from the group consisting of alkali metals, beryllium, magnesium, zinc, cadmium, mercury, aluminum, gallium, indium and thallium, for example, magnesium, ethyl bromide and titanium tetrachloride, as such, or with the addition of metallic aluminum;

(c) A Group IV halide, for example, titanium tetrachloride, and a low valence metal identified in (b), for example, sodium or magnesium;

(d) A mixture of titanium hydride and an aluminum alkyl halide, i.e., a mixture of titanium hydride and ethylaluminum sesquichloride;

(e) An organoaluminum halide such as diethylaluminum chloride and a trivalent metal halide such as titanium trichloride;

(f) A mixture of molybdenum pentachloride and organometal compounds and halides exemplified by triethylaluminum and ethylaluminum dichloride;

(g) A mixture of complex metal halides, exemplified by potassium fluotitanate, and an organometal compound and halides exemplified by triethylaluminum and diethylaluminum chloride;

(h) A mixture of a derivative selected from the oxides of molybdenum, alkali metal and ammonium molybdates, and an organometal halide exemplified by isobutylaluminum dichloride;

(i) A mixture of a derivative of iridium, platinum and osmium selected from the group consisting of halides, oxides and complex compounds of iridium, platinum and osmium, said complex compounds corresponding to the formula $M_xM'X_y$, wherein M is an alkali metal or an ammonium radical, M' is iridium, platinum or osmium, X is a halogen, and $y$ is at least 1 and the sum of $x$ and $y$ is equal to the valence of M' and a metallic organic compound exemplified by triethylaluminum, for example, iridium chloride and triethylaluminum or ethylaluminum sesquichloride;

(j) A mixture of a derivative of a metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium and ammonia and an organometal compound exemplified by triethylaluminum, for example, molybdenum pentachloride and ethylaluminum dichloride;

(k) A chromyl halide and at least one of the following (1) a metal hydride or an organometal compound, (2) an organometal halide and (3) a mixture of an organic halide and a metal, for example, chromyl chloride, ethyl bromide and magnesium;

(l) (1) A titanium derivative, (2) a complex hydride, and (3) a halide of aluminum, for example, tetrabutyl titanate, lithium aluminum hydride and aluminum chloride;

(m) At least one halide of titanium, zirconium or hafnium and at least one hydride of lithium, sodium, potassium, rubidium, cesium, magnesium, calcium, strontium, barium, lanthanum or thorium, for example, zirconium tetrachloride and calcium hydride;

(n) (1) A hydrocarbon derivative of one of the metals, zinc, cadmium, mercury, and magnesium and (2) a member selected from the group consisting of halides of titanium, zirconium, vanadium and molybdenum, oxyhalides of titanium, zirconium, vanadium, molybdenum and chromium, and complex salts of said halides and oxyhalides with a number selected from the group consisting of halides of the alkali metals and ammonia, for example, diethylzinc and titanium tetrachloride;

(o) (1) A tri- or tetrahalide of titanium, zirconium, hafnium and germanium, (2) an organophosphorus-containing compound and (3) at least one of the following (a) an organo metal halide, (b) a mixture of an organic halide and a metal, and (c) a complex hydride, for example, triethylaluminum, titanium tetrachloride and a triphenyl phosphine;

(p) (1) A tri- or tetrahalide of titanium, zirconium, hafnium and germanium, (2) a peroxide of the formula R'OOR' where R' is hydrogen, alkyl, aralkyl, alkaryl, cycloalkyl, acyl, alkyne, or aryl, and (3) at least one of the following: (a) an organometal halide, (b) a mixture of an organic halide and a metal and (c) a complex hydride, for example, ethylaluminum sesquichloride, titanium tetrachloride and benzoyl peroxide;

(q) (1) A tri- or tetrahalide of titanium, zirconium, hafnium and germanium, (2) a metal alkoxide and (3) at least one of the following: (a) an organometal halide, (b) a mixture of an organic halide and a metal, and (c) a complex hydride, for example, ethylaluminum sesquichloride, aluminum ethylate and titanium tetrachloride;

(r) (1) A halide of titanium, zirconium, hafnium or germanium, (2) a hydride selected from the group consisting of hydrides of aluminum, gallium, indium and thallium and complexes of said hydrides with alkali metal hydrides, and (3) an organic halide, for example, titanium tetrachloride, lithium aluminum hydride and ethyl bromide;

(s) (1) A halide of titanium, zirconium, hafnium, or germanium, (2) carbides and acetylenic compounds and (3) at least one of the following: (a) an organometal halide, (b) a mixture of an organic halide and a free metal, and (c) a complex hydride, for example, ethylaluminum sesquichloride, titanium tetrachloride and copper acetylide.

One catalyst system which is preferred for use in the polymerization comprises a dialkylaluminum chloride and titanium trichloride, the latter compound preferably being prepared by reduction of titanium tetrachloride with aluminum. The reduction product thus prepared is a complex having the approximate formula $3TiCl_3 \cdot AlCl_3$. The reduction reaction can be carried out at an elevated temperature, for example, at a temperature in the range of 360 to 600° F., preferably from 375 to 450° F.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal halide falls within the range of 0.02 to 50.

Although not essential, it is often desirable to carry out the polymerization in the presence of elemental hydrogen.

The systems used for removal of catalyst residues by the method of the present invention include an alkylene oxide and a dicarbonyl compound. The dicarbonyl compounds used with the adjuvants of this invention are those materials containing the group:

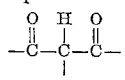

Such materials are those selected from the group consisting of (a) compounds of the general formula:

(a) 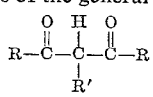

and (b) compounds of the general formula:

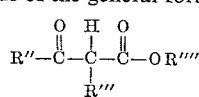

In compound (a) each R can be an alkyl, cycloalkyl, aryl, aralkyl, alkaryl, alkylcycloalkyl, or cycloalkyalkyl group or the R's can be joined to form a cyclic structure and R' can be hydrogen or an alkyl, cycloalkyl, aryl, alkaryl, aralkyl, alkylcycloalkyl, cycloalkylalkyl group, the number of carbon atoms in each R and R' being from 1 to 8.

In compound (b) R" is an alkyl, cycloalkyl, aryl, aralkyl, alkaryl, alkylcycloalkyl, cycloalkylalkyl group or an OR"" group group; R''' is hydrogen or a hydrocarbon group as defined for R"; and R"" is a hydrocarbon group as defined for R", the number of carbon atoms in R", R''', and R"" being from 1 to 8.

Typical of such compounds are 2,4-pentanedione (acetylacetone), 2,4 - hexenedione, 2,4 - heptanedoine, 5-methyl - 2,4 - hexanedione, 2,4 - octanedione, 5,5 - dimethyl - 2,4 - hexanedione, 3 - ethyl - 2,4 - pentanedione, 2,2 - dimethyl - 3,5 - nonanedione, 1 - cyclohexyl - 1,3-butanedione, 5,5 - dimethyl - 1,3 - cyclohexanedione, 1-phenyl - 1,3 - butanedione, 1 - (4 - biphenylyl) - 1,3-butanedione, 1 - phenyl - 1,3 - pentanedione, 1 - phenyl-5,5 - dimethyl - 2,4 - hexanedione, 1,3 - diphenyl - 1,3-propanedione, 1,4 - diphenyl - 1,3 - butanedione, 1-phenyl - 2 - benzyl - 1,3 - butanedione, 1 - phenyl - 3-benzyl - 9,11 - nonadecanedione, 8,10 - heptadecanedione, 8 - ethyl - 7,9 - heptadecanedione, 6 - octyl - 5,7 - undecanedione, 4 - phenyl - 3,5 - heptanedione, 1,3 - cyclohexanedione, ethyl acetoacetate, methyl acetoacetate, n-propyl acetoacetate, isopropyl acetoacetate, tert-butyl acetoacetate, diethyl malonate, dimethyl malonate, di-n-propyl malonate, diisopropyl malonate, di-tert-butyl malonate, octyl acetoacetate, heptyl acetoacetate, phenyl acetoacetate, diphenyl malonate, dicyclohexyl malonate, dicyclohexyl octylmalonate, dihexyl phenylmalonate, ethyl 3-oxopentanoate, octyl-3-oxoundecanoate, methyl 3-oxo-4-phenylbutanoate, ethyl 3-oxo-5-phenylpentanoate, octyl 3-oxo-2-phenylundecanoate, octyl 3-oxo-2-octylundecanoate, cyclohexyl 3-oxo-6-cyclopentylhexanoate, and the like.

Of the various compounds represented by these formulas, acetylacetone and ethyl acetoacetate are preferred.

The alkylene oxides used as adjuvants in the present invention are compounds containing from 2 to 8 carbon atoms and which include in their molecular structure at least one oxirane group having the structure

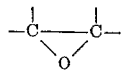

These compounds can be represented by the general formula:

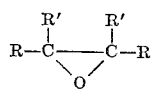

in which each R and each R' can be a hydrogen atom, an alkyl, cycloalkyl, or aryl group, or an epoxy-containing cyclic or alicyclic hydrocarbon group; and in which the R groups can be joined to form a carbocyclic group.

Typical compounds of this type include: epoxyethane, 1,2 - epoxypropane, 1,2 - epoxybutane, 2,3 - epoxybutane, 1,2,3,4 - diepoxybutane, 1,2,4,5 - diepoxypentane, 1,2,4,5,7,8 - triepoxyoctane, 2,3 - epoxy - 2,3 - dimethylbutane, 2,3 - epoxy - 2 - methyl - 3 - ethylpentane, epoxyethylbenzene, epoxyethylcyclohexane, epoxyethyl - 3,4-epoxycyclohexane, 1,2 - epoxycyclohexane, 2,3 - epoxyethylcyclohexane, 1,2 - epoxycyclopentane, and the like.

The amount of dicarbonyl compound used will be from 1 to 5 gram mols per gram atom of total metal in the catalyst charged. The amount of alkylene oxide used will be sufficient to provide from 1 to 5 gram moles of oxide per gram atom of halogen in the catalyst charged. The chelator and adjuvant can be introduced directly by themselves into the contact zone, or they can be added separately, or in combination in solution in an inert hydrocarbon.

In the preparation of polymers of monoolefins, a presently preferred procedure involves conducting the reaction in the presence of a catalyst comprising an alkylaluminum halide and a titanium trihalide, the temperature being maintained at a level such that the polymer is formed as a finely divided solid. The reaction is conducted in a suitable reaction diluent. While various hydrocarbons can be used as diluents, it is generally preferred that the polymerization be conducted as a mass operation in which the unreacted monomer acts as the diluent. By whatever means the polymerization is conducted conditions are maintained such that the polymer is formed and recovered as a finely divided solid.

In the preferred practice of the invention the polymer is dispersed in solid state in a hydrocarbon diluent and treated in such dispersion. In many instances it is convenient to conduct the polymerization using the liquid monomer as the reaction diluent under conditions to provide a pulverulent solid polymer and treat the polymer for removal of catalyst in this diluent after termination of the polymerization. However, it is within the scope of the invention to replace the unreacted liquid monomer after polymerization has been terminated with another hydrocarbon material and conduct the extraction step therein. In any case it is important to prevent contact of the system with air or moisture prior to an during the extraction step. Extraction will be conducted in a temperature range such that the polymer will not be degraded and for a sufficient period of time to reduce the undesired impurities to an acceptable level. This time will vary with temperature, degree of mixing, etc., but will generally be from one minute to several hours, preferably 10 to 100 minutes.

The polymer slurry may be passed to a filter, wherein the treated solid polymer is separated from the diluent, the latter also containing the catalyst residues. To remove any adhering liquid, the polymer is washed on the filter, removed and dried.

In a preferred embodiment of the present invention, a polymer slurry, which has been treated according to the present invention to extract catalyst residues, passes to a washing step wherein the solid polymer undergoes further purification comprising contacting the polymer particles countercurrently with a hydrocarbon which is maintained in the liquid phase, preferably the same olefin used in the polymerization. Various hydrocarbons, particularly paraffinic hydrocarbons containing from 3 to 7 carbon atoms per molecule, such as pentane, heptane, and the like, can be employed as the wash liquid, although, as stated, it is preferred to utilize the monomer in liquid phase for this purpose.

The treated effluent is removed from the treating to the washing zone for the purification step just described. The overhead stream recovered from the wash zone contains monomer, soluble polymers, catalyst residues and a small amount of solid polymer. This stream can be separated into its various components if desired and the purified monomer recycled. The bottom stream from the washing zone comprises a solid polymer substantially free of catalyst residues.

The present invention is particularly applicable to polymers such as polypropylenes, prepared by polymerization of propylene in the presence of a catalyst system comprising a complex of titanium trichloride which can be represented by the approximate formula $3TiCl_3 \cdot AlCl_3$ together with diethylaluminum chloride, the polymerization being carried out at a temperature in the range between 100 and 140° F. While not essential, it is frequently desirable to conduct the polymerization in the presence of elemental hydrogen charged to the reactor prior to or in combination with the monomer charge.

While the method of this invention is particularly useful in treating dispersions of solid polymers to remove catalyst residues, it can also be employed to advantage to treat polymers in solution. In many polymerization systems, the reactor effluent comprises polymer in solution in a hydrocarbon solvent. Such a solution can be passed to a treating vessel wherein the extracting agent of this invention is added. The contact time is for a period sufficient to reduce the catalyst residues in the recovered polymer to an acceptable level, which may be from a few minutes up to several hours.

The polymer is separated from the liquid phase and can be further purified, if desired, by washing.

A more comprehensive understanding of the invention can be obtained by referring to the following illustrative examples which are not intended, however, to be unduly limitative of the invention.

EXAMPLE I

A series of runs was conducted in which propylene was polymerized. Some of these runs were made in a two-gallon reactor, the remainder in a one-gallon reactor. The reactor charges used are shown in Table I.

Table I

| | 2-gallon | 1-gallon |
|---|---|---|
| $TiCl_3$ complex,[a] gm | 0.5 | 0.4 |
| DEAC,[b] gm | 0.94 | 0.75 |
| Hydrogen, mol. percent [c] | 5.0 | 3.0 |
| Propylene, liters | 5.0 | 3.0 |
| Temperature, °F | 110 | 110 |
| Time, hours | 2 | 2 |

[a] $3TiCl_3 \cdot AlCl_3$.
[b] Diethylaluminum chloride.
[c] Based on propylene charged.

The titanium trichloride complex and diethylaluminum chloride were charged first, after which the reactor was closed and the hydrogen introduced. The propylene was then charged and the temperature adjusted. At the end of the polymerization in the one-gallon reactor, the dicarbonyl compound was injected along with the desired amount of propylene oxide after which the temperature was adjusted to extracting range. After extraction the extracting solution (propylene plus chelator and propylene oxide) was drained liquid phase. The polymer was then rinsed twice with three liters of propylene.

In the two-gallon reactor at the termination of polymerization, the excess propylene was vented gas phase after which one gallon of dry heptane was charged. The temperature was adjusted to extraction level and the dicarbonyl compound and propylene oxide charged. After extraction the heptane was pressured from the reactor through a dip tube and the polymer rinsed twice at room temperature with one-gallon portions of dry heptane. In these operations suitable controls were run and the comparative catalyst removal obtained. Observations were also made to note the presence or absence of hydrogen chloride from the extraction step. Data are tabulated in Table II.

Table II
PROPYLENE OXIDE AS ADJUVANT FOR ETHYL ACETOACETATE FOR TREATMENT OF POLYPROPYLENE

| Run No. | Slurry medium | Extraction | | | | | | Cat. residues, p.p.m. | | HCl evolution |
|---|---|---|---|---|---|---|---|---|---|---|
| | | Time, min. | Temp., °F. | EAA[a] | | Prop. oxide | | Ti | Al | |
| | | | | Gm. | Equiv.[b] | Gm. | Equiv.[c] | | | |
| 1 | Propylene | 90 | 120 | 4.16 | 1.2 | | | 240 | 75 | HCl evolved. |
| 2 | do | 90 | 120 | 4.16 | 1.2 | 0.996 | 1.2 | 50 | 15 | None. |
| 3 | do | 30 | 120 | 4.16 | 1.2 | 0.996 | 1.2 | 113 | 20 | Do. |
| 4 | do | 90 | 140 | 4.16 | 1.2 | | | 348 | 58 | HCl evolved. |
| 5 | do | 90 | 140 | 4.16 | 1.2 | 0.996 | 1.2 | 45 | 12 | None. |
| 6 | n-Heptane | 60 | 140 | 4.77 | 1.1 | | | 207 | 140 | HCl evolved. |
| 7 | do | 60 | 140 | 4.77 | 1.1 | 1.133 | 1.1 | 77 | 18 | None. |

[a] Ethyl acetoacetate.
[b] Times stoichiometric amount for total Ti and Al.
[c] Times stoichiometric amount for atoms Cl in catalyst.

This example shows that titanium and aluminum are removed most effectively with a combination of ethyl acetoacetate and propylene oxide, and that the values so obtained are lower than with ethyl acetoacetate alone. It is also shown that the evolution of HCl is eliminated when the propylene oxide is present.

EXAMPLE II

A run was made in the one-gallon reactor according to the procedure described in Example I. Treatment for catalyst removal was conducted with acetylacetone and propylene oxide. Data on this work are shown in Table III.

*Table III*

| Run No. | Slurry medium | Extraction | | | | | Cat. residues, p.p.m. | | Ash | HCl Evolution |
|---|---|---|---|---|---|---|---|---|---|---|
| | | Time, min. | Temp., °F. | Acetylacetone | | Prop. oxide | | | | |
| | | | | Gm. | Equiv.a | Gm. | Equiv.b | Ti | Al | | |
| 1 | Propylene | 60 | 140 | 5.8 | 2.0 | | | 11 | 8 | 34 | Evolved. |
| 2 | ----do---- | 45 | 140 | 5.9 | 2.0 | | | 1 | 10 | 33 | Do. |
| 3 | ----do---- | 30 | 140 | 5.5 | 2.0 | | | 1 | 1 | 27 | Do. |
| 4 | ----do---- | 60 | 140 | 5.5 | 2.0 | 1.4 | 1.2 | 1 | 1 | 20 | None. |
| 5 | ----do---- | 45 | 140 | 5.7 | 2.0 | 1.5 | 1.2 | 1 | 1 | 23 | Do. |
| 6 | ----do---- | 30 | 140 | 4.6 | 2.0 | 1.2 | 1.2 | 1 | 0 | 40 | Do. | a Times stoichiometric amount for total Ti and Al.
b Times stoichiometric amount for atoms Cl in catalyst.

When a mixture of acetylacetone and propylene oxide were employed as treating agent for the residues, Ti, Al, and total ash were all significantly reduced to within acceptable levels. Moreover, HCl evolution was not observed.

EXAMPLE III

A continuous run was made in a 50 gallon reactor, for the preparation of polypropylene. Treatment of the polymer produced for catalyst removal was conducted with acetylacetone and/or propylene oxide. The polymerization process was carried out at a temperature about 115° F. and pressure of 400 p.s.i.g. The liquid polypropylene feed rate averaged about 10 gallons per hour. The mole percent of hydrogen in the propylene feed ranged between 0.14 and 0.19. The aluminum reduced titanium trichloride complex addition averaged about 0.01 pound per hour. The diethyl aluminum chloride addition averaged about 0.014 pound per hour. The pressure employed in the reactor was sufficient to maintain a liquid monomer phase. The residence time for polymerization averaged 5 hours.

The reactor effluent was passed to a contacting vessel wherein acetylacetone as chelator and propylene oxide as an adjuvant were added in controlled amounts. The acetylacetone addition averaged 0.074 pound per hour, equivalent to 1.5 times the stoichiometric amount required for complexing total metal components of catalyst charged to the reactor. Propylene oxide was charged to the chelating agent feed tanks, as desired. The chelating treatment took place at a temperature of 140–145° F. under a pressure of 400 p.s.i.g. to maintain the unreacted propylene in the liquid phase. The contact time in the contacting vessel ranged from 45 minutes to one hour. The treated effluent was withdrawn from the upper portion of the contacting vessel and passed into the upper portion of a polymer wash column. Washed polypropylene was withdrawn from the lower portion of the wash column and samples taken for analyses.

A chronological log over the course of several days of continuous operation of this unit, describing observed variations in operating conditions and the quality of the polymer product is listed below:

| | | |
|---|---|---|
| 1st day | 0800 hours | The chelating agent feed tank was charged with a dilute solution of acetylacetone in n-pentane. Polypropylene oxide was omitted, in order to conduct the contacting step with acetylacetone only. The acetylacetone was added to the contactor at the rate of 0.074 lb./hr. |
| | 1105 hours | Some plugging was observed in the contacting vessel. |
| | 1630 hours | Polymer sample A, weighing 46 pounds, was withdrawn for analysis. Analyzed with an ash content of 218 p.p.m. and titanium of 32 p.p.m. |
| | 1640 hours | The reactor effluent was switched to a flash chamber to bypass the contacting vessel, as plugging of the contactor had been very frequent. It was impossible to continue using the contacting vessel and wash column system. |
| 2nd day | 0900 hours | Disassembly of the contacting vessel disclosed that the bottom stage of the contactor was full of polymer, most of it being of a fused consistency. However, there was a hard ring of polymer around the bottom section above the agitator blades employed in the contactor. |
| 3rd day | 0400 hours | After the contacting vessel had been restored to service, the reactor effluent was directed back to the contactor and wash column system. The reactants were soon restored to their normal feed rates to the contactor. |
| | 0830 hours | Polymer sample B, weighing 34 pounds, was withdrawn from the wash column. The sample analyzed as 118 p.p.m. of ash and 31 p.p.m. of titanium. |
| | 1330 hours | Lower stage of the contactor plugged. It was concluded that the contactor will plug when acetylacetone alone is used as catalyst removal agent. Therefore, the contactor was cleaned and 1000 cc. of propylene oxide was added to the acetylacetone present in the feed tank. This amount of propylene oxide was equivalent to 1.5 times the stoichiometric amount required to react with the HCl liberated by the reaction between acetylacetone and metals in the catalyst. Operations were then continued. |
| | 1630 hours | Polymer sample C, weighing 66 pounds, was withdrawn from the wash column. It analyzed 14 p.p.m. of ash. |
| 4th day | 0030 hours | Polymer sample D, weighing 65 pounds was withdrawn. It analyzed 13 p.p.m. of ash and 10 p.p.m. of titanium. Operation of the contactor and wash column ran smoothly. |
| | 0830 hours | Polymer sample E, weighing 70 pounds, was withdrawn. It analyzed 40 p.p.m. of ash and 12 p.p.m. of titanium. |

It is evident from this run that when acetylacetone is employed as the sole treating agent, the solid polymer particles had a distinct tendency to agglomerate and plug up the contacting vessel. Moreover, catalyst residues in recovered polymer exceeds acceptable levels. Use of the propylene oxide in conjunction with the acetylacetone permitted smooth operation of the contacting step, and reduced the total ash content and titanium content to acceptable levels.

Reasonable variation and modification are possible within the scope of the foregoing disclosure and the appended claims to the invention.

I claim:

1. The method of removing impurities from a polymer prepared by catalytic polymerization in the presence of a catalyst having at least two essential components, one of said components being a metal compound selected from the group consisting of Group IV, Group V, Group VI, and Group VIII metal compounds, and another of said components being selected from the group consisting of organometal compounds, metal hydrides, and metals of Groups I, II and III, and at least one of said components containing at least one halogen atom attached to a metal atom, which comprises contacting said polymer dispersed in a hydrocarbon diluent, while the latter is under conditions such that said diluent remains in liquid phase, with a treating agent comprising from 1 to 5 gram mols per gram atom of total metal in the catalyst of a compound selected from the group consisting of compounds represented by the following structural formulas:

(a) 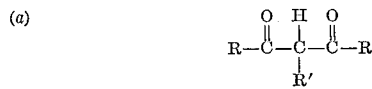

and (b) 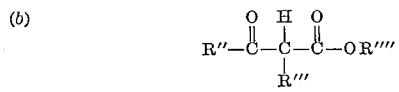

in which each R can be an alkyl, cycloalkyl, aryl, alkaryl, alkylcycloalkyl, cycloalkylalkyl, aralkyl groups, or can be joined to form a cyclic structure; R' is a hydrogen, an alkyl, cycloalkyl, aryl, alkaryl, alkylcycloalkyl, aralkyl groups; R'' can be an alkyl, cycloalkyl, aryl, alkaryl, aralkyl, alkylcycloalkyl, cycloalkylalkyl, R'' can be attached through an O atom; R''' is a hydrogen or hydrocarbon group as defined for R''; R'''' is a hydrocarbon group as defined for R''; and the number of carbon atoms in each, R, R', R'', R''' and R'''' being from 1 to 8; and an adjuvant comprising from 1 to 5 gram mols per gram atom of halogen in the catalyst of an alkylene oxide selected from the group consisting of epoxyethane, 1,2-epoxypropane, 1,2-epoxybutane, 2,3-epoxybutane, 1,2,3,4-diepoxybutane, 1,2,4,5 - diepoxypentane, 1,2,4,5,7,8 - triepoxyoctane, 2,3-epoxy-2,3-dimethylbutane, 2,3-epoxy-2-methyl-3-ethyl-ethylpentane, epoxyethylbenzene, epoxyethylcyclohexane, epoxyethyl-3,4-epoxycyclohexane, 1,2-epoxycyclohexane, 2,3-epoxyethylcyclohexane, and 1,2-epoxycyclopentane, and separating said polymer from the resulting mixture substantially free of catalyst residues.

2. Process for the removal of catalyst residues from polymers wherein a mono-1-olefin is contacted with a catalyst having at least two essential components, one of said components being a metal compound selected from the group consisting of Group IV, Group V, Group VI, and Group VIII metal compounds, and another of said components being selected from the group consisting of organometal compounds, metal hydrides, and metals of Groups I, II and III, and at least one of said components containing at least one halogen atom attached to a metal atom under polymerization conditions so as to form solid polymer in particle form and wherein an effluent containing solid polymer, catalyst residues, and olefin is recovered from said polymerization, which comprises introducing said effluent into a contact zone, mixing said effluent in said contact zone with a treating agent comprising from 1 to 5 gram mols per gram atom of total metal in the catalyst of a compound selected from the group consisting of compounds represented by following formulas:

(a) 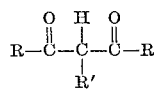

and (b) 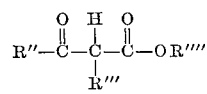

in which each R can be an alkyl, cycloalkyl, aryl, alkaryl, alkylcycloalkyl, cycloalkylalkyl, aralkyl groups, or can be joined to form a cyclic structure; R' is a hydrogen, an alkyl, cycloalkyl, aryl, alkaryl, alkylcycloalkyl, cycloalkylalkyl, aralkyl groups; R'' can be an alkyl, cycloalkyl, aryl, alkaryl, aralkyl, alkylcycloalkyl, cycloalkylalky, R'' can be attached through an O atom; R''' is a hydrogen or hydrocarbon group as defined for R''; R'''' is a hydrocarbon group as defined for R''; and the number of carbon atoms in each R, R', R'' R''' and R'''' being from 1 to 8; and an adjuvant comprising from 1 to 5 gram mols per gram atom of halogen in the catalyst of an alkylene oxide having from two to eight carbon atoms under conditions such that said olefin remains in liquid phase; recovering the thus treated effluent; washing said treated effluent by contacting same in countercurrent flow with a hydrocarbon having from 3 to 7 carbon atoms under conditions such that said hydrocarbon and said olefin remain in liquid phase; and thereafter recovering a solid polymer substantially free of catalyst residues.

3. The process according to claim 2 in which said compound is acetylacetone and said adjuvant is selected from the group consisting of epoxyethane, 1,2-epoxypropane, 1,2-epoxybutane, 2,3-epoxybutane, 1,2,3,4-diepoxybutane, 1,2,4,5 - diepoxypentane, 1,2,4,5,7,8 - triepoxyoctane, 2,3-epoxy-2,3-dimethylbutane, 2,3-epoxy-2-methyl-3-ethylpentane, epoxyethylbenzene (styrene oxide), epoxyethylcyclohexane, epoxyethyl-3,4-epoxycyclohexane, 1,2-epoxycyclohexane, 2,3-epoxyethylcyclohexane and 1,2-epoxycyclopentane.

4. The process according to claim 2 in which said compound is ethyl acetoacetate and said adjuvant is selected from the group consisting of epoxyethane, 1,2-epoxypropane, 1,2-epoxybutane, 2,3-epoxybutane, 1,2,3,4-diepoxybutane, 1,2,4,5-diepoxypentane, 1,2,4,5,7,8-triepoxyoctane, 2,3-epoxy-2,3-dimethylbutane, 2,3-epoxy-2-methyl-3-ethylpentane, epoxyethylbenzene (styrene oxide), epoxyethylcyclohexane, epoxyethyl-3,4-epoxycyclohexane 1,2-epoxycyclohexane, 2,3-epoxyethylcyclohexane, and 1,2-epoxycyclopentane.

5. The process according to claim 2 in which said mono-1-olefin is propylene and said hydrocarbon is heptane.

References Cited by the Examiner

UNITED STATES PATENTS

| | | | |
|---|---|---|---|
| 2,974,132 | 3/1961 | Jacobi et al. | 260—94.9 |
| 3,002,961 | 10/1961 | Kirschner et al. | 260—94.9 |
| 3,066,124 | 11/1962 | Telfer | 260—93.7 |
| 3,098,845 | 7/1963 | Cull et al. | 260—94.9 |

JOSEPH L. SCHOFER, *Primary Examiner.*